United States Patent [19]
Morishima et al.

[11] Patent Number: 5,180,561
[45] Date of Patent: Jan. 19, 1993

[54] PLATE TYPE REFORMER ASSEMBLY

[75] Inventors: Satoshi Morishima, Kashima; Sakae Chidiiwa, Tokyo, both of Japan

[73] Assignee: Ishikawajima-Harima Heavy Industries Co., Ltd., Tokyo, Japan

[21] Appl. No.: 617,996

[22] Filed: Nov. 26, 1990

[30] Foreign Application Priority Data

Nov. 27, 1989 [JP] Japan .................. 1-304766

[51] Int. Cl.$^5$ .............................................. B01J 10/00
[52] U.S. Cl. .................................. 422/191; 422/188; 48/94; 48/127.9
[58] Field of Search ............... 422/188, 191, 202, 204; 48/127.9, 198.7, 94; 429/17, 19

[56] References Cited

U.S. PATENT DOCUMENTS

| | | | |
|---|---|---|---|
| 2,730,434 | 1/1956 | Houdry | 422/188 |
| 3,528,783 | 9/1970 | Haselden | 422/188 |
| 4,182,795 | 1/1980 | Baker et al. | 429/19 |
| 4,365,007 | 12/1982 | Maru et al. | 429/17 |
| 4,504,447 | 3/1985 | Spurrier et al. | 422/204 |
| 4,618,543 | 10/1986 | Matsumura et al. | 429/19 |
| 4,838,897 | 6/1989 | Amano et al. | 48/198.7 |
| 5,015,444 | 5/1991 | Koga et al. | 422/191 |

FOREIGN PATENT DOCUMENTS

| | | |
|---|---|---|
| 0308976 | 3/1989 | European Pat. Off. |
| 61-086935 | 5/1986 | Japan . |
| 63-291802 | 10/1989 | Japan . |

OTHER PUBLICATIONS

Patent Abstracts of Japan, vol. 10, No. 262 (C-371) Sep. 6, 1986 (re: JPA 61,086,935).
Patent Abstracts of Japan, vol. 13, No. 119 (C-579) Mar. 23, 1989 (re: JPA 63,291,802).
EP Search Report, Application No. 90122675.3.
6001-Chemical Abstracts 110: 234633a, Columbus, Ohio, Jun. 29, 1989 (re: JPA 63,291,802).

*Primary Examiner*—Robert J. Warden
*Assistant Examiner*—Krisanne M. Thornton
*Attorney, Agent, or Firm*—Trexler, Bushnell, Giangiorgi & Blackstone, Ltd.

[57] ABSTRACT

A reformer assembly includes fuel introduction plates, combustion chamber plates and reforming chamber plates. The fuel introduction plate includes a first plate member and a first masking frame on the periphery of the first plate member. The combustion chamber plate includes a second plate member and a second masking frame on the periphery of the second plate member, and combustion catalyst is placed in the combustion chamber plate. The reforming chamber plate includes a third plate member and a third masking frame on the periphery of the third plate member, and reforming catalyst is placed in the reforming chamber plate. The first masking frame has a fuel feeding port. The second plate member has a number of dispersion holes and the second masking frame has air feeding and exhaust gas discharging ports. The third masking frame has raw material gas feeding and reformed gas discharging ports. These plates are stacked to define a multi-layer unit. The peripheries of the adjacent stacked plates are welded to each other. Manifolds for the aligned gas feeding and discharging ports are mounted on lateral faces of the unit. Sealing is unnecessary between the plates due to the welding. In addition, the feeding and discharging of the various gases become easy since the manifolds are mounted on the multi-layer unit.

29 Claims, 4 Drawing Sheets

PLATE TYPE REFORMER ASSEMBLY

BACKGROUND OF THE INVENTION

1. Technical Field

The present invention relates to a reformer assembly for reforming hydrocarbon such as methane under a presence of steam and particularly relates to a reformer assembly including a plurality of stacked plate-type reformers.

2. Background Art

A lot of fuel cell systems have been developed. The fuel cell system is a power generation system and generally hydrogen is fed to an anode of the fuel cell and oxygen is fed to a cathode of the fuel cell to produce electricity. As the hydrogen is fed to the fuel cell, the hydrocarbon gas such as methane is reformed to a raw material gas for the anode under a presence of steam with a reforming catalyst. The reforming reactions which take place at the just mentioned reformation are:

$$CH_4 + H_2O \rightarrow CO + 3H_2$$

$$CO + H_2O \rightarrow CO_2 + H_2$$

These reactions are endothermic reactions and in order to maintain reforming temperature it is necessary to heat reforming reaction parts.

A conventional plate-type reformer assembly includes reforming plates and combustion plates. The reforming plates and the combustion plates are stacked one after another, thereby defining multiple layers. Generally, the reforming plate is filled with the reforming catalyst and the combustion plate is filled with combustion catalyst. Fuel and air are simultaneously fed to the combustion plates and combusted therein to heat the adjacent upper and lower reforming plates (the combustion plate is sandwiched by the reforming plates). The combustion plate has an entrance and an exit. The reforming temperature of the raw material gas passing through the reforming plates is maintained at a proper level by the combustion in the combustion plates. However, in a case where the fuel and the air are simultaneously fed to the combustion plates, the combustion entirely or mostly takes place near the entrance of the combustion plate and reaches flame temperature. Therefore, a large temperature difference appears between the entrance and the exit of the combustion plate.

Japanese Utility Model Registration Application No. 62-145404 eliminates the above-mentioned drawback. According to an arrangement of this application, a combustion section includes a combustion plate and a dispersion plate. Air is fed to the combustion plate and fuel is fed to the dispersion plate. The fuel fed to the dispersion plate is homogeneously fed into the entire combustion plate. As a result, a homogeneous combustion takes place in the combustion plate and a flat temperature distribution is obtained.

However, in the plate type reformer assembly of Japanese Utility Model Registration Application No. 62-145404, passages for feeding and discharging various gases penetrate the plate type reformers. Consequently, it is necessary to provide adequate sealing between the plates (of reformers) which are stacked one after another.

SUMMARY OF THE INVENTION

An object of the present invention is to provide a plate type reformer assembly which only requires simple sealing between the plates.

Another object of the present invention is to provide a plate type reformer assembly whose gas-feeding and discharging ports are simple and require only simple sealing.

According to one aspect of the present invention, there is provided a reformer assembly characterized in that masking frames are integrally mounted on peripheries of plate members to define a fuel introduction plate (fuel feeding plate), a combustion chamber plate filled with combustion catalyst and a reforming chamber plate filled with reforming catalyst respectively, that fuel feed ports are formed in the masking frame of the fuel introduction plate, that a number of dispersion openings (holes) are formed in the plate member of the combustion chamber plate, that an air feeding port and an exhaust gas discharging port are formed in the masking frame of the combustion chamber plate, that a raw material gas feed port and a reformed gas discharge port are formed in the masking frame of the reforming chamber plate, that these plates are stacked in turn and the peripheries of the plates are welded to each other thereby defining a multi-layer unit and that manifolds for the gas-feeding and discharging ports are aligned and mounted on lateral faces of the multi-layer unit. According to this arrangement, each masking frame is integrally provided on the periphery of each plate member, and the gas feeding and discharging passages are formed in the masking plates. Also, the plates are welded to each other. Therefore, the sealing between the plates becomes adequate. In addition, the feeding and the discharging of the various gases become easy since the manifolds are mounted on the lateral faces of the multi-layer unit.

DESCRIPTION OF THE PREFERRED EMBODIMENTS

A preferred embodiment of the present invention will be described with reference to the accompanying drawings.

Figure 1:
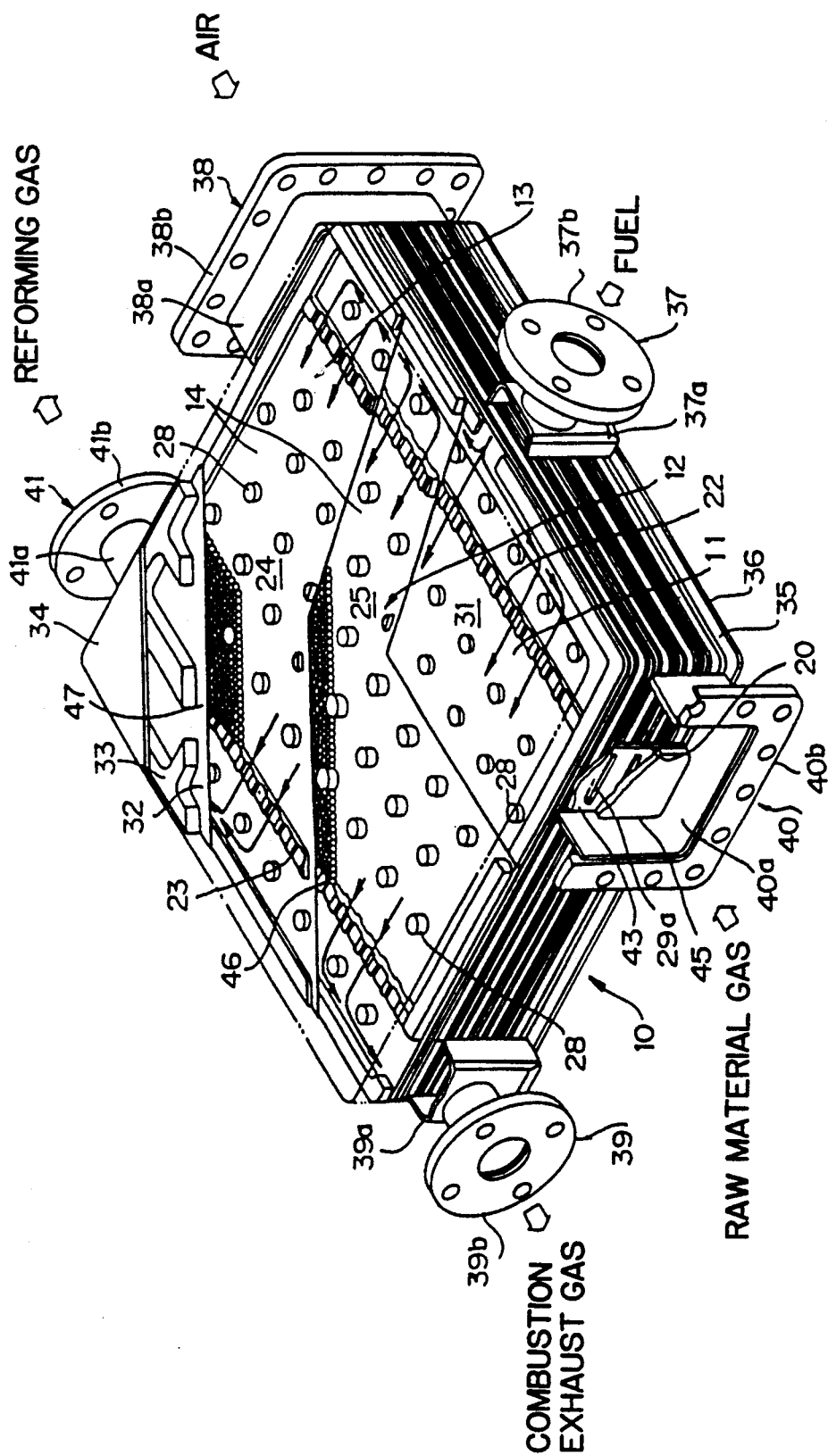
FIG. 1 is a perspective partial sectional view of a plate type reformer assembly according to the present invention.

Referring first to FIG. 1, a plate type reformer assembly includes a multi-layer unit 10. The multi-layer unit 10 includes fuel introduction plates 11, combustion chamber plates 12 and reforming chamber plates 13. These plates are stacked in turn to define the multi-layer unit 10.

Figure 2A:
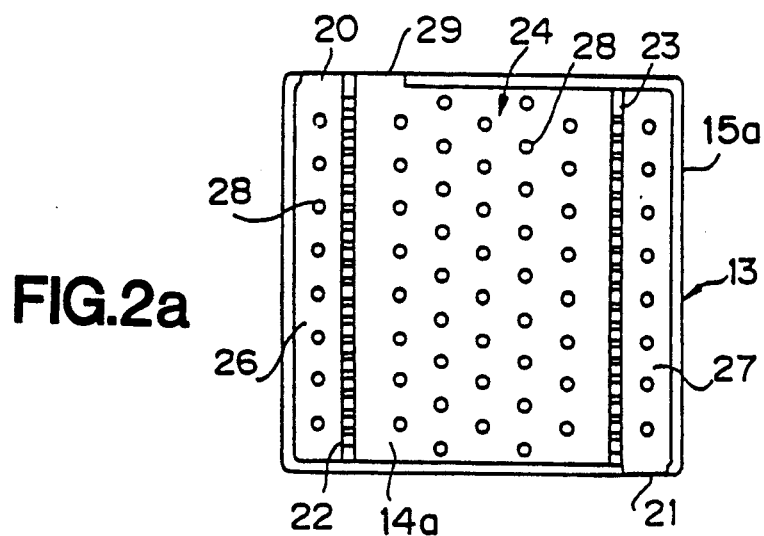
FIGS. 2(a), 2(b) and 2(c) are a set of views illustrating detail of three plates of the reformer assembly of FIG. 1.
Figure 2B:
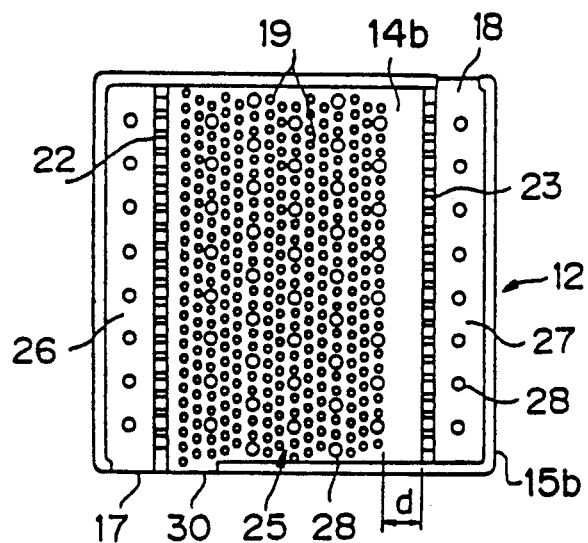
Figure 2C:
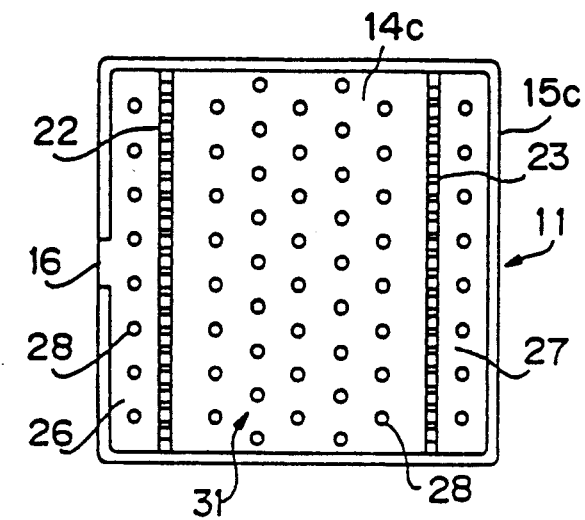

The plates 11, 12 and 13 are illustrated in detail in FIGS. 2(a), 2(b) and 2(c) respectively. The plates 11, 12 and 13 respectively include plate members 14a, 14b and 14c and masking frames 15a, 15b and 15c. The masking frame 15a is integrally welded on a periphery of the plate member 14a. Such is the case with the masking frame 15b and the plate member 14b and with the maksing frame 15c and the plate member 14c. The plate members 14a, 14b and 14c are equal to each other in size. As illustrated in FIG. 2(c), a fuel feeding port 16 is formed in the masking frame 15c of the fuel introduction plate 11. An air feeding port 17 and an exhaust gas discharging port 18 are formed in the masking frame 15b of the combustion chamber plate 12, and a number of dispersion holes 19 are formed in the plate member 14b of the combustion chamber plate 12, as shown in FIG. 2(b). A raw material gas feeding port 20 and a reformed gas discharging port 21 are formed in the masking frame 15a of the reforming chamber plate 13, as shown in FIG. 2(a). Partition members 22 and 23 stand on the plate members 14a to 14c. The partition plate 22 (or 23) has a crenellated portion at the top and bottom thereof. The partition plates 22 and 23 define therebetween a reforming chamber 24 on the reforming chamber plate 13. Reforming catalyst is placed in the reforming chamber 24. Likewise, the partition members 22 and 23 extend through the combustion chamber plate 12 to define a combustion chamber 25 on the combustion chamber plate 12 between the partition members 22 and 23. Combustion catalyst is placed in the combustion chamber 25. The partition members 22 and 23 further extend through the fuel introduction plate 11 to define a fuel introduction chamber 31 on the fuel introduction plate 11 between the partition members 22 and 23. Outside the partition plates 22 and 23 on the plates 11, 12 and 13 respectively, there are formed entrance rooms 26 and exit rooms 27. The feeding and discharging ports 16, 17, 18, 20 and 21 for various gases communicate with the entrance rooms 26 and the exit rooms 27. Predetermined number of small cylindrical elements, which serve as spacers, 28 are provided on the plate members 14a, 14b and 14c respectively. The spacers 28 and the masking frame 15a (or 15b or 15c) respectively reach a substantailly same height in a direction the plates 11, 12 and 13 are stacked (The masking frames 15a, 15b and 15c have different heights and the spacers 28 have three heights for the respective frames).

The raw material gas feeding port 20 of the reforming chamber plate 13 is formed in the masking frame 15a in a manner such that the port 20 communicates with the entrance room 26. The masking frame 15a has an opening 29 which is next to the raw material gas feeding port 20. The reforming catalyst is inserted (or loaded) into the reforming chamber 24 through the catalyst insertion and removal (or loading and unloading) opening 29. Likewise, the masking frame 15b of the combustion chamber plate 12 has an opening 30 which is next to the air feeding port 17. The combustion catalyst is placed into the combustion chamber 25 through the second catalyst insertion and removal opening 30. The dispersion holes 19 are bored between the partition elements 22 and 23, but a predetermined margin (d) is left on the exit room 27 side, as shown in FIG. 2(b).

Figure 3:
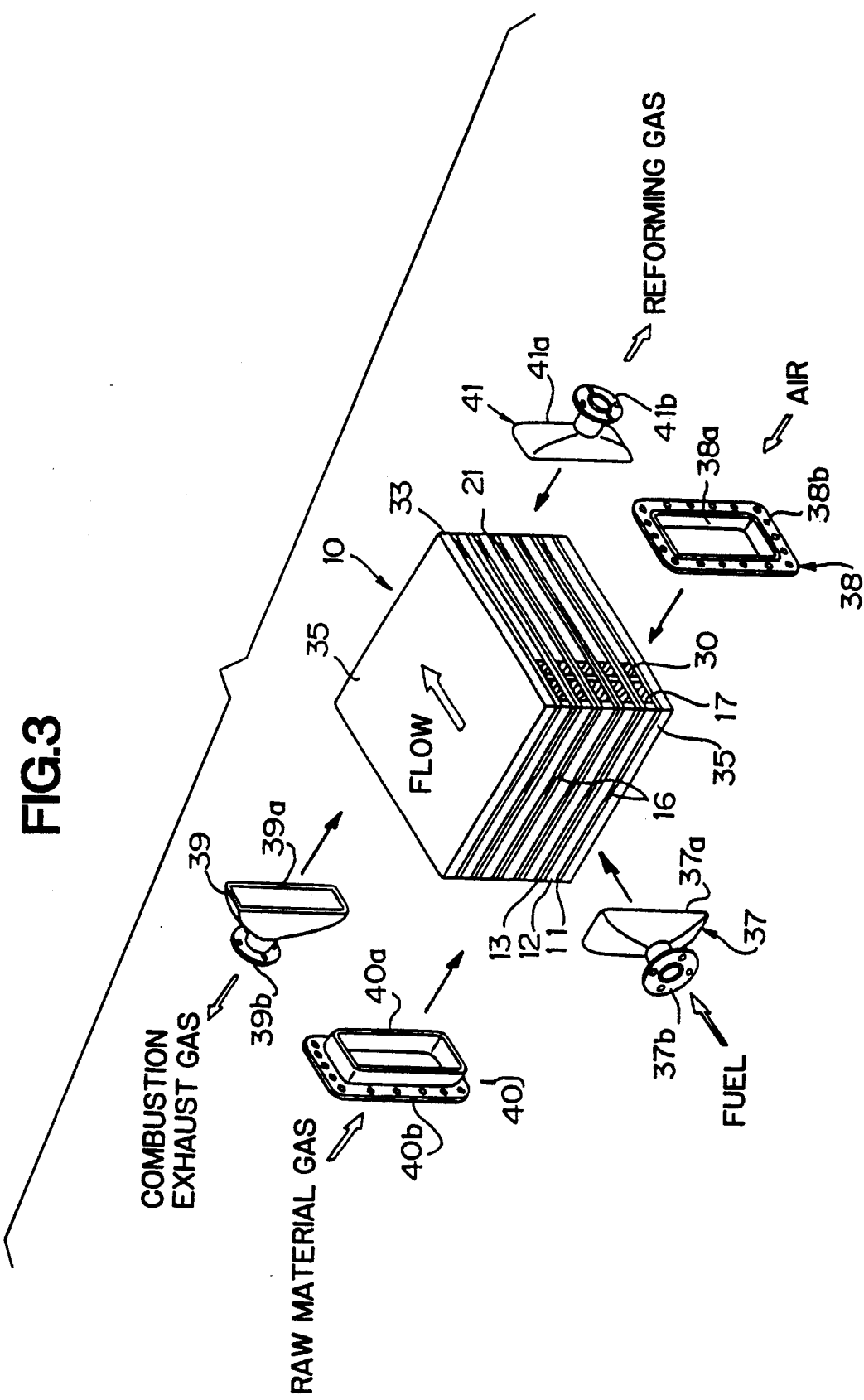
FIG. 3 is a perspective view when manifolds are mounted on a multi-layer unit.

The combustion chamber plate 12 is placed on the fuel introduction plate 11 associated with the masking frame 15 and the partition members 22 and 23 (The plates 12 and 13 are also associated with the masking frame 15 and the partition members 22 and 23) and then the reforming chamber plate 13 is placed on the combustion chamber plate 12. After that, another fuel introduction plate 11 is placed on the reforming chamber plate 13. Then, the plates 11, 12 and 13 are stacked in turn while a welding such as TIG or MIG is applied to the adjacent plates, thereby forming the multi-layer unit 10 of FIG. 3. On the reforming chamber plate 13 of the top layer of the layer unit 10, there is provided a separation or isolation plate 32 which covers the reforming chamber 24, the entrance room 26 and the exit room 27, as shown in FIG. 1. Also as shown in FIG. 1, a supporting frame/plate 33 is provided on the separation plate 32 and an upper plate 34 is provided on the supporting frame/plate 33. Under the fuel introduction plate 11 of the bottom layer of the multi-layer unit 10, there is provided a lower support frame/plate 35. A lower plate 36 is provided under the lower support frame/plate 35.

After the multi-layer unit 10 is assembled in a manner described just above, the feeding and discharging ports 16, 17, 18, 20 and 21 are aligned in a height direction of the unit 10 and on the lateral face of the unit 10. Manifolds 37, 38, 39, 40 and 41 are provided for the feeding and discharging ports 16, 17, 18, 20 and 21 respectively by means of welding. Specifically, the fuel feeding manifold 37 is provided for the fuel feeding port 16 of the fuel introduction plate 11, the air feeding manifold 38 is provided for the air feeding port 17 of the combustion chamber plate 12, the exhaust gas manifold 39 is provided for the exhaust gas port 18 of the plate 12, the raw material gas feeding manifold 40 is provided for the raw material gas feeding port 20 of the reforming chamber plate 13 and the reformed gas discharging manifold 41 is provided for the discharge port 21 of the reforming plate 13.

Figure 4:
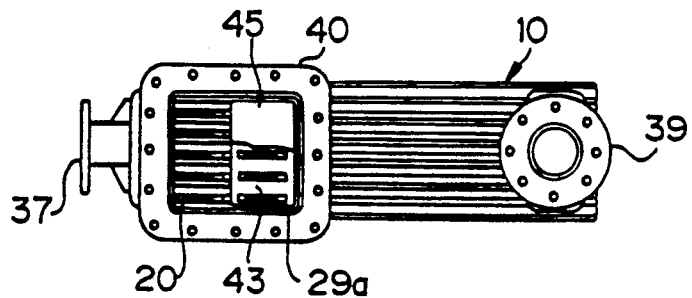
FIG. 4 is a rear view of a plate type reformer assembly according to the present invention.
Figure 5:
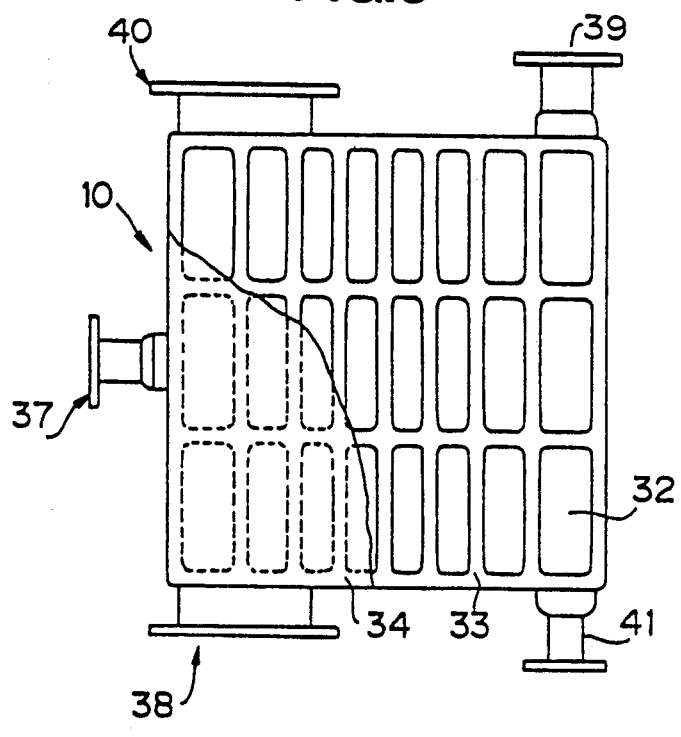
FIG. 5 is a top view of the plate type reformer assembly.
Figure 7:
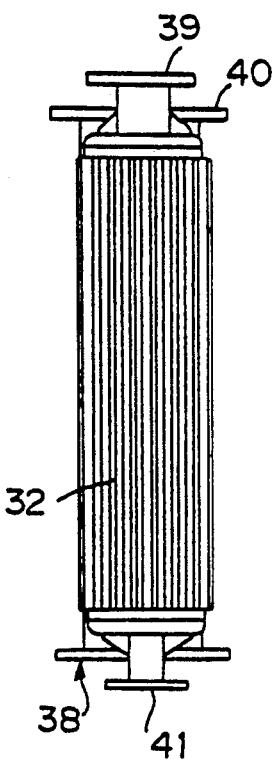
FIG. 7 is a lateral view of the plate type reformer assembly.
Figure 6:
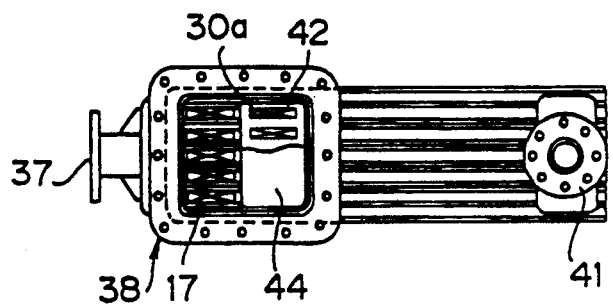
FIG. 6 is a front view of a plate type reformer assembly.

The manifolds 37, 38, 39, 40 and 41 include connecting cylinders 37a, 38a, 39a, 40a and 41a and flanges 37b, 38b, 39b, 40b and 41b, respectively. The cylindrical members 37a to 41a cover the aligned feeding and discharging ports 16, 17, 18, 20 and 21 at the lateral face of the multi-layer unit 10. In this case, the cylindrical members 38a and 40a of the air feeding mainfold 38 and the raw material gas feeding manifold 40 also cover the combustion catalyst filling port 30 and the reforming catalyst filling port 29, respectively. Plates 42 and 43 are provided at the catalyst filling ports 30 and 29. The plates 42 and 43 have slit-like openings 30a and 29a which respectively correspond to the catalyst filling openings 30 and 29, as shown in FIGS. 4 to 6. The plates 42 and 43 are welded on the multi-layer unit 10. The cylindrical members 38a and 40a of the air feeding manifold 38 and the raw material gas feeding manifold 40 also cover the plate 42 and 43. Sealing plates 44 and 45 are removably mounted on the plates 42 and 43 by means of, for example, screws to close the slit-like openings 30a and 29a.

With the reformer assembly being constructed in the above manner, the combustion catalyst (spheres) 46 (for example, palladium-containing catalyst) and the reforming catalyst (spheres) 47 (for example, nickel-containing catalyst) are filled into the combustion chamber 25 and the reforming chamber 24 from the slit-like openings 30a and 29a of the plates 42 and 43 of the air feeding manifold 38 and the raw material gas feeding manifold 40, as depicted in FIG. 1. Then, the sealing plates 44 and 45 are mounted on the plates 42 and 43 by screws to close the openings 30a and 29a.

During the reforming operation, the fuel gas (for example, offgas discharged from the anode of the fuel cell) is fed into the fuel feeding manifold 37 and the air is fed from the air feeding manifold 38. On the other hand, the raw material gas containing methane and steam is fed from the raw material gas feeding manifold 40. These gases are introduced from the manifolds 37, 38 and 40 to the entrance rooms 26 of the plates 11, 12 and 13 via the feeding ports 16, 17 and 20 formed in the plates 11, 12 and 13 respectively and then flow into the chambers inside the plates 11, 12 and 13 via the concave portions of the partition elements 22. As the fuel gas enters the introduction chamber 31 of the fuel introduction plate 11 via the inlet port 16 and the entrance room 26, the fuel gas flows homogeneously into the entire combustion chamber 25 from the introduction chamber 31 via the dispersion holes 19 of the upper combustion chamber plate 12. On the other hand, the air is fed into the combustion chamber 25 via the air feeding port 17 of the combustion chamber plate 12, the entrance room 26 and the concave portion of the partition member 22. Then, the air mixes with the fuel gas entering the combustion chamber 25 through the dispersion holes 19 to cause the combustion with help of the combustion catalyst. The exhaust gas of this combustion flows into the exit room 27 via the exit side partition member 23 and is discharged from the discharge port 18 via the exhaust manifold 39. The heat generated upon the combustion in the combustion chamber 25 is transferred to the reforming chamber 24 via the reforming chamber plate 13. Methane and steam are fed to the reforming chamber 24 via the feeding port 20 and the entrance room 26 and reformed to $H_2$ and CO gas with help of reforming catalyst due to the above-mentioned reforming reactions. The gases after the reformation are introduced, for example, to the anode of the fuel cell from the exit room 27 through the discharge port 21 and the reforming gas discharging manifold 41. As the quality of the combustion catalyst 46 and the reforming catalyst 47 are lowered due to the long period of usage, the sealing plates 44 and 45 are removed and the old catalysts 46 and 47 will be replaced by new ones through the openings 30a and 29a of the plates 42 and 43.

Since each plate 11, 12 or 13 has the welding around the periphery thereof, the feeding and discharging ports 16, 17, 18, 20 and 21 are opened in the lateral face of the multi-layer unit 10, and the manifolds 37, 38, 39, 40 and 41 for the ports 16, 17, 18, 20 and 21 are mounted by the welding, the sealing between the plates 11, 12 and 13 becomes unnecessary. Therefore, the characteristics related to the gas leakage is considerably improved. In addition, since the major manufacturing steps are only the plate-stacking and the manifold-welding, the manufacturing is simplified.

In the foregoing embodiment, the plate 11 has the entrance room 26 and the exit room 27 at the same location as the plates 12 and 13 have. However, the entrance room 26 and the exit room 27 of the plate 12, for instance, may be formed at another location. In addition, the destinations of the air and the fuel may be exchanged to each other. Furthermore, in order to accomodate the thermal expansion of the plate 11 (or/and 12 or/and 13), the plate member 14a (or/and 14b or/and 14c) may have a wave-like portion between and near the partition members 22 and 23.

In the above embodiment, the combustion catalyst mainly includes the spherical catalyst in order to make the catalyst exchange easier. However, it is of course that the catalyst may have a form other than the sphere.

What is claimed is:

1. A reformer assembly, comprising:
a multi-layer unit including fuel introduction plates, combustion chamber plates, reforming chamber plates and a separation plate,
each fuel introduction plate having a first plate member and a first masking frame, the first masking frame being integrally mounted on the periphery of the first plate member, a fuel feeding port being formed in the first masking frame, a pair of first partition members being provided on the fuel introduction plate, each partition member having a crenellated structure, a fuel introduction room being defined between the pair of first partition members, a first entrance room and a first exit room being defined outside the first partition members respectively, the fuel feeding port being open to the first entrance room,
each combustion chamber plate having a second plate member and a second masking frame, the second masking frame being integrally mounted on the periphery of the second plate member, and an air feeding port, an exhaust gas discharging port and a combustion catalyst insertion opening being respectively formed in the second masking frame, a pair of second partition members being provided on the combustion chamber plate, each second partition member having a crenellated structure, a combustion chamber being formed between the second pair of partition members, a second entrance room and a second exit room being defined outside the second pair of partition members respectively, the second plate member having a plurality of dispersion openings between the pair of second partition members, the air feeding port being open to the second entrance room, the exhaust gas discharging port being open to the second exit room, the combustion catalyst insertion opening being open to the combustion chamber, the combustion catalyst insertion opening being aligned with one of the second partition members such that a combustion catalyst moves to the combustion catalyst insertion opening along the one of the second partition members when the combustion catalyst is withdrawn out of the combustion chamber through the combustion catalyst insertion opening,
each reforming chamber plate having a third plate member and a third masking frame, the third masking frame being integrally mounted on the periphery of the third plate member, and a raw material gas feeding port, a reformed gas discharging port and a reforming catalyst insertion opening being respectively formed in the third masking frame, a third pair of partition members being provided on the reforming chamber plate, each third partition member having a crenellated structure, a reforming chamber being defined between the pair of third partition members, a third entrance room and a third exit room being defined outside the pair of third partition members respectively, the raw material gas feeding port being open to the third entrance room, the reformed gas discharging port being open to the third exit room, the reforming catalyst insertion opening being open to the reforming chamber, the reforming catalyst insertion opening being aligned with one of the third partition members such that a reforming catalyst moves to the reforming catalyst insertion opening along the one of the third partition members when the reforming catalyst is withdrawn out of the reforming chamber through the reforming catalyst insertion opening, the fuel introduction plates, the combustion chamber plates and the reforming chamber plates being stacked in turn to define multiple layers, a top one of said layers being referred to as an uppermost layer, the multi-layer unit having a lateral face, with the feeding ports, discharging ports, combustion catalyst insertion openings and reforming catalyst insertion openings being respectively aligned in a direction in which the plates are stacked, the separation plate being provided on the reforming chamber plate of the uppermost layer of the unit, the fuel introduction plate, the combustion chamber plate, the reforming chamber plate and the separation plate being connected to each other at the peripheries thereof;

manifolds attached to the lateral face of the multi-layer unit to cover the feeding and discharging ports;

a combustion catalyst layer being defined by a combustion catalyst in each combustion chamber plate;

a reforming catalyst layer being defined by a reforming catalyst in each reforming chamber plate;

first sealing means for opening and closing the combustion catalyst insertion openings; and second sealing means for opening and closing the reforming catalyst insertion openings.

2. The assembly of claim 1, wherein the fuel introduction plates, combustion chamber plates, reforming chamber plates, and separation plate each have a plurality of spacer members on the corresponding plate member thereof, the plurality of spacer members having the same height as the corresponding masking frame.

3. The assembly of claim 2, wherein the plurality of dispersion openings of the combustion chamber plate are formed in the second plate member between the pair of second partition members.

4. The assembly of claim 3, wherein the plurality of dispersion openings are not formed in a predetermined area near the pair of second partition members on the second exit room side.

5. The assembly of claim 1, wherein the combustion catalyst of the combustion catalyst layer is shaped like spheres.

6. The assembly of claim 5, wherein the reforming catalyst of the reforming catalyst layer is shaped like spheres.

7. The assembly of claim 1, wherein the multi-layer unit is formed in a manner such that the entrance rooms and the exit rooms of the fuel introduction plates, the combustion chamber plates and the reforming chamber plates are respectively aligned in a direction in which the fuel introduction plates, the combustion chamber plates and the reforming chamber plates are stacked.

8. The assembly of claim 7, wherein the multi-layer unit has four lateral faces, arranged in two pairs of faces facing each other, and the air feeding port and the combustion catalyst insertion opening of the combustion chamber plate are formed in a lateral face facing an opposite face in which the raw material gas feeding port and the reforming catalyst insertion opening of the reforming chamber plate are formed.

9. The assembly of claim 8, wherein the manifolds include a connecting cylinder welded on the lateral face of the multi-layer unit which covers the feeding and discharging ports and a flange connected to the connecting cylinder.

10. The assembly of claim 9, wherein the sealing means includes a plate having a slit-like opening corresponding to the catalyst insertion openings and welded on the lateral face of the multi-layer unit and a sealing plate mounted on the plate by means of screws.

11. The assembly of claim 8, wherein the manifolds include a raw material gas feeding manifold and a air feeding manifold which respectively have a configuration to cover the feeding ports and the catalyst insertion openings, and the catalyst insertion openings are provided with sealing means to seal the catalyst insertion openings.

12. The assembly of claim 8, wherein the fuel introduction plates, combustion chamber plates, reforming chamber plates, and separation plate are welded by welding of the periphery of the adjacent plates.

13. The assembly of claim 1, wherein a first pair of upper and lower supporting plates are mounted on the top and the bottom of the multi-layer unit, and a second pair of upper and lower plates are mounted on the first pair of upper and lower supporting plates.

14. A reformer assembly, comprising:

a multi-layer unit including fuel introduction plates, combustion chamber plates, reforming chamber plates and a separation plate, each fuel introduction plate having a first plate member and a first masking frame, the first masking frame being integrally mounted on the periphery of the first plate member and a fuel feeding port being formed in the first masking frame, each combustion chamber plate having a second plate member and a second masking frame, the second masking frame being integrally mounted on the periphery of the second plate member, a plurality of dispersion holes being formed in the second plate member, and an air feeding port and an exhaust gas discharging port being respectively formed in the second masking frame, each reforming chamber plate having a third plate member and a third masking frame, the third masking frame being integrally mounted on the periphery of the third plate member, and a raw material gas feeding port and a reformed gas discharging port being respectively formed in the third masking frame, the third masking frame containing a reforming catalyst the fuel introduction plates, the combustion chamber plates and the reforming chamber plates being stacked in turn to define multiple layers, a top one of said layers being referred to as an uppermost layer, the multi-layer unit having a direction in which the plates are stocked and a lateral face, with the feeding ports and discharging ports, being aligned respectively in the direction in which the plates are stacked, the separation plate being provided on the reforming chamber plate of the uppermost layer of the multi-layer unit, the fuel introduction plate, the combustion chamber plate, the reforming chamber plate and the separation plate being welded to each other at the peripheries thereof;

manifolds welded on the lateral face of the multi-layer unit to cover the feeding and discharging ports; and means for insertion and removal of catalyst into and from at least one of the combustion chamber plates or the reforming chamber plates without disassembly of the multi-layer unit.

15. The assembly of claim 14, wherein the fuel introduction plates, combustion chamber plates, reforming chamber plates, and separation plate each have a pair of crenellated partition members on the corresponding plate member thereof to define a fuel introduction chamber, a combustion chamber or a reforming chamber between the partition members and to define an entrance room and an exit room outside the partition member, the partition member defining the entrance room being called entrance room side partition member and the partition member defining the exit room being called exit room side partition member.

16. The assembly of claim 15, wherein the partition member has a crenellated portion to allow gases to pass through the partition member via the crenellated portion.

17. The assembly of claim 16, wherein the fuel introduction plates, combustion chamber plates, reforming chamber plates, and separation plate each have a plurality of spacer members on the corresponding plate member thereof, the plurality of spacer members having the same height as the corresponding masking frame.

18. The assembly of claim 17, wherein the plurality of dispersion holes of the combustion chamber plate are formed in the second plate member between the partition members.

19. The assembly of claim 18, wherein the plurality of dispersion holes are not formed in a predetermined area near the partition member on the exit room side.

20. The assembly of claim 14, wherein the combustion chamber contains a combustion catalyst shaped like spheres.

21. The assembly of claim 15, wherein a combustion catalyst insertion and removal opening is formed aligned with one of the partition members of the combustion chamber plate on the entrance room side and the air feeding port is formed next to the combustion catalyst insertion and removal opening over the one partition member.

22. The assembly of claim 21, wherein a reforming catalyst insertion and removal opening is formed aligned with one of the partition members of the reforming chamber plate on the entrance room side and the raw material gas feeding port is formed next to the reforming catalyst insertion and removal opening over the one partition member.

23. The assembly of claim 22, wherein the multi-layer unit is formed in a manner such that the entrance rooms and the exit rooms of the fuel introduction plates, the combustion chamber plates and the reforming chamber plates are respectively aligned in a direction in which the fuel introduction plates, the combustion chamber plates and the reforming chamber plates are stacked.

24. The assembly of claim 23, wherein the multi-layer unit has four lateral faces, arranged in two pairs of faces facing each other, and the air feeding port and the combustion catalyst insertion and removal opening of the combustion chamber plate are formed in a lateral face facing an opposite face in which the raw material gas feeding port and the reforming catalyst insertion and removal opening of the reforming chamber plate are formed.

25. The assembly of claim 24, wherein each manifold includes a connecting cylinder welded on the lateral face of the multi-layer unit which covers the feeding and discharging ports and a flange connected to the connecting cylinder.

26. The assembly of claim 25, wherein the sealing means includes a plate having a slit-like opening corresponding to the catalyst insertion and removal opening and welded on the lateral face of the multi-layer unit and a sealing plate mounted on the plate by means of screws.

27. The assembly of claim 14, wherein the reforming catalyst contained within the third masking frame of the reforming chamber plate is shaped like spheres.

28. The assembly of claim 14, wherein the manifolds include a raw material gas feeding manifold and an air feeding manifold which respectively have a configuration to cover the feeding ports and the catalyst insertion and removal openings, and the catalyst insertion and removal openings are provided with sealing means to seal the catalyst insertion and removal openings.

29. The assembly of claim 14, wherein a first pair of upper and lower supporting plates are mounted on the top and the bottom of the multi-layer unit, and a second pair of upper and lower plates are mounted on the first pair of upper and lower supporting plates.

* * * * *